United States Patent
Biriuk et al.

(10) Patent No.: US 12,231,993 B2
(45) Date of Patent: Feb. 18, 2025

(54) WIRELESS BIDIRECTIONAL COMMUNICATION NETWORK FOR UAV

(71) Applicant: Microavia International Limited, Dublin (IE)

(72) Inventors: Ivan Biriuk, Saint Petersburg (RU); Andrey Komarov, Saint Petersburg (RU); Artem Trubin, Saint Petersburg (RU); Denis Maksimov, Saint Petersburg (RU)

(73) Assignee: Microavia International Limited, Dublin (IE)

( * ) Notice: Subject to any disclaimer, the term of this patent is extended or adjusted under 35 U.S.C. 154(b) by 293 days.

(21) Appl. No.: 17/652,363

(22) Filed: Feb. 24, 2022

(65) Prior Publication Data
US 2023/0269563 A1    Aug. 24, 2023

(51) Int. Cl.
*H04W 76/10*    (2018.01)
*H04W 4/12*    (2009.01)
*H04W 84/06*    (2009.01)

(52) U.S. Cl.
CPC ............. *H04W 4/12* (2013.01); *H04W 76/10* (2018.02); *H04W 84/06* (2013.01)

(58) Field of Classification Search
CPC ................................ H04W 4/12; H04W 76/10
USPC ........................................................ 370/329
See application file for complete search history.

(56) References Cited

U.S. PATENT DOCUMENTS

| | | | |
|---|---|---|---|
| 9,415,869 B1 | 8/2016 | Chan et al. | |
| 9,712,228 B2 | 7/2017 | Jalali et al. | |
| 9,809,306 B2 | 11/2017 | Stark et al. | |
| 10,114,384 B2 | 10/2018 | Liu et al. | |
| 10,514,709 B2 | 12/2019 | Shattil | |
| 10,515,555 B2 | 12/2019 | High et al. | |
| 2015/0338855 A1* | 11/2015 | Stark | G08G 5/0013 701/3 |
| 2020/0033850 A1* | 1/2020 | Yang | H04W 4/80 |
| 2021/0403159 A1 | 12/2021 | Dey et al. | |

FOREIGN PATENT DOCUMENTS

| | | |
|---|---|---|
| CN | 108260092 A | 7/2018 |
| CN | 108616302 B | 10/2018 |
| CN | 110661547 A | 1/2020 |

(Continued)

OTHER PUBLICATIONS

European Search Report EP22020124, Aug. 11, 2022.
(Continued)

*Primary Examiner* — Sibte H Bukhari
(74) *Attorney, Agent, or Firm* — ESPE Legal Consultancy FZ-LLC (57) ABSTRACT

A system and method establish bidirectional communication between an UAV terminal and a GCS terminal. Each terminal includes first and second communication modules. The first communication module is based on a radio module and the second communication module is based on wireless communication for data transfer. Through the radio module, the first communication unit of GCS terminal requests the UAV terminal to activate the second communication unit. The flight control data is then transmitted to the UAV terminal from the GCS terminal where the flight mission is planned and optimized.

20 Claims, 7 Drawing Sheets

(56) References Cited

FOREIGN PATENT DOCUMENTS

| | | |
|---|---|---|
| CN | 112306079 A | 2/2021 |
| CN | 112578809 A | 3/2021 |
| CN | 113572519 A | 10/2021 |
| KR | 20160128144 A | 11/2016 |
| KR | 20210010164 A | 1/2021 |
| KR | 20210010172 A | 1/2021 |
| PL | 431104 A1 | 3/2021 |
| TW | M593114 U | 4/2020 |

OTHER PUBLICATIONS

Andrew Kopeikin, et. al: Control of Communication Networks for Teams of UAVs, https://link.springer.com/referenceworkentry/10.1007/978-90-481-9707-1_19, Jan. 1, 2014.
Sukhrob Atoev, et. al: An efficient SC-FDM modulation technique for a UAV communication link, https://www.researchgate.net/publication/329188093_An_efficient_SC-FDM_modulation_technique_for_a_UAV_communication_link, Nov. 2018.
Laura Michaella Batista Ribeiro, et. al: Communication Interface Manager for Improving Performance of Heterogeneous UAV Networks, https://www.researchgate.net/publication/352686591_Communication_Interface_Manager_for_Improving_Performance_of_Heterogeneous_UAV_Networks, Jun. 2021.
Kimon P., et. al: Handbook of Unmanned Aerial Vehicles, https://link.springer.com/referencework/10.1007/978-90-481-9707-1.

* cited by examiner

WIRELESS BIDIRECTIONAL COMMUNICATION NETWORK FOR UAV

TECHNICAL FIELD

The present disclosure generally relates to wireless communication for Unmanned Aerial Vehicle (UAV). In particular, the present disclosure relates to a system for wireless bidirectional data transmission between a ground control station (GCS) and at least two groups of Unmanned Aerial Vehicles (UAV).

BACKGROUND

An unpiloted vehicle or Unmanned Aerial Vehicle (UAV), which may operate autonomously or be remotely controlled by a nearby user may be referred to as drones. The term UAV or drone may also encompass other types of autonomous flying devices. The copter class of UAVs or drones may include any number of spinning blades that create lift by forcing air downward or in other directions. Initial uses of UAVs included surveillance and aerial photography. Recent efforts have expanded into many other fields including surveying, package delivery, robot waiters, and other applications. According to such applications, a single UAV or multiple UAVs may be deployed on a mission. For consumer applications, such as photography, a single UVA may be deployed. For critical applications with larger scope, such as military surveillance or delivery of large payload, a UVA flock may be deployed. Each UAV may be assigned with certain tasks within the scope of the mission. UAVs can be controlled autonomously or semi-autonomously, or manually. Many UAVs are remotely controlled by human operators. Some UAVs are autonomous and configured with control-boards with trajectories and computer instructions stored in for piloting the UAVs along the trajectories.

First, for piloting the UAVs, the UAVs must be provided with flight control data signals or flight mission plans that can be recoded into a control board of the UAV. Second, UAV requires operation data signals that may include task assignment, sensor inputs, geo-graphical location related data, trajectory plan, and the like. At both instances, the required flight control signals and flight operation data signals can be transmitted to UAVs by Ground Control Stations (GCS). GCSs are typically configured to communicate with the UAV for transmitting data, that may include the flight control signals and flight operation data signals.

To establish communication with GCS, most UAVs have at least two wireless communication modules. One wireless communication module can be configured to receive flight control data transmitted by the GCS. Based upon the received control data, various operational state of a UAV may be adjusted including position, attitude, speed, and the like. Another wireless module can be configured to transmit flight operation data to a UAV by the GCS. The flight operation data may include trajectory path, assigned tasks, sensor inputs, weather inputs, and other similar data.

Some UAVs may have built-in sensors, such as accelerometer, gyroscope, terrestrial magnetism sensor, etc., for monitoring one or more parameters that may affect the flight operation. The GCS operating on the ground computer may act as a command center of the UAV. Therefore, GCS may require sensor data from the UAVs. For such data transmission, the GCS establishes a connection with the UAV by wireless data transmission technique. Due to real-time data transmission from the UAV, the GCS can process the sensor data, and can display the position and flight operational data of the UAV in real time to monitor the flight state of the UAV. In case of any change in a flight plan, for example, because of sudden changes in weather parameters, the GCS can communicate with UAV and transmit the control signals to UAV corresponding to the change in the flight plan. Acquiring sensor data signals from the UAV, and transmitting the control signals back to UAV, and conducting adjusting and intervention accordingly, such as controlling the flight mode and parameters of the UAV, customizing the flight mission, can render most effective flight and UVA missions. For such controlling operation, bidirectional communication established between UAV and the GCS is crucial.

Bidirectional communication networks typically include a transmitter and receiver pair, or a transceiver implemented at the GCS, and a transmitter and receiver pair or a transceiver implemented at the UAV. In some instances, the flight control data signals, and sensor data signals may have to be transmitted simultaneously. For example, the GCS and UAV may transmit the data at the same time. For that purpose, bidirectional communication may be established through a wireless communication network which can be a bidirectional packet-based data network. In some examples, the same frequency bands (e.g., the 2.4 GHz band) can be used for both control data signal transmission and operational data signal transmission.

Bidirectional communication can be constructive and reliable at some extent when the communication has to be established between single UVA and the GCS. However, when a UAV flock is deployed having a large number of UVAs, simultaneous communication within GCS and multiple UAVs becomes difficult. Interference can occur when the control data signal is being transmitted at the same time as the operational data signal over a shared frequency band, causing poor data reception, disruption of normal operations or even loss of control of the UAV. One solution to poor data communication problems could be utilization of additional infrastructure, such as more transmitters and receivers. However, additional infrastructure components lead to infrastructure related difficulties, such as maintenance, added cost, failures and troubleshooting and such.

SUMMARY

The present disclosure relates to a system and method for establishing bidirectional communication between a Ground Control Station (GCS) and at least two groups of Unmanned Aerial Vehicles (UAVs). The GCS may be configured to transmit flight control signals and flight operation data, referred as to a first sensor data signals, to each UVA from the at least two groups of UAVs and receive flight operation data, referred as to a second sensor data signals, from each UVA from the at least two groups of UAVs, in accordance with one embodiment.

UAV may be an aerial vehicle, controlled autonomously from remotely located GCS, and assigned with a specific task. Particularly with the embodiment, there may be multiple UAVs assigned with a single mission. Within a single mission, each UAV may have been assigned with a similar task as that of other UAVs of the flock, or each UVA may have been assigned with a different task as that of other UAVS of the flock, according to one implementation of the embodiment. The UAV terminal may be configured to receive flight control signals and the first sensor data signals from the GSC and transmit the second sensor data signals to GCS, in one embodiment. The UAV flock may be divided into at least two groups of UVAs, referred to as the first group of UAVs and second group of UAVs.

The GCS terminal, according to one embodiment, may include a first communication unit to establish an uplink communication channel with a radio module of each UAV terminal in a first group of UAVs from the two groups of UAVs. Each UAV terminal may have a built-in radio module, having a radio receiver, to receive radio signals transmitted from any radio transmitter, for example, a radio transmitter of the GCS. Radio communication may allow broadcasting of at least one radio massage. According to the embodiment, the GCS is further configured to transmit either one or more radio messages or one or more commands or both to each UAV terminal in the first group of UAVs over the established communication channel. Thus, each UVA from the at least two UAV groups can receive radio messages or commands from the GCS, according to the embodiment.

The GCS terminal, in accordance with the embodiment, may further include a second communication unit to establish a wireless exchange link with a wireless communication module of each UAV in the first group of UAVs. The wireless communication module may facilitate a data transfer of control signals and sensor data signals between the GCS terminal and each UAV terminal. The wireless communication module may include a data transmitter and receiver pair and/or a transceiver implemented at the GCS terminal and each UAV terminal to facilitate transmission and reception of the wireless data transfer. One or more wireless data protocols may be implemented to establish wireless communication. The second communication unit may further be configured to exchange flight control data with each UAV terminal in the first group of UAVs over the wireless exchange link. The flight control data may be transmitted in the form of wireless data packets with the identity of a transmitter and destination nodes along with the data. If the destination node matches the address of a group of UAVs, each UAV terminal from the respective group of UAVs, may acknowledge the data transmission. Over the wireless communication protocols, the wireless data packet may be transmitted by the GCS to each UAV. Each wireless data packet may be unique and specifically addressed to respective UAV. In one implementation, all wireless data packet may include same data. In another implementation, each UAV may receive different data in accordance with the control signals transmitted by the GCS.

In some embodiments, the radio communication may broadcast a communication request by the GSC terminal for all relevant UAVs. Upon receiving the broadcasting message, the UAVs may activate their respective second communication modules to initiate wireless data communication.

According to one embodiment, the GSC terminal may broadcast a second broadcasting message to all UAVs which also includes an identifier mask. Upon identifying the identifier mask, the UVA terminal may receive the second broadcasting message requesting deactivation of wireless communication module. In response to the second broadcasting message, the UAV terminal may deactivate the second communication module.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The embodiments will now be described more fully hereinafter with reference to the accompanying figures, in which preferred embodiments are shown. The foregoing may, however, be embodied in many different forms.

A detailed description of one or more embodiments of the invention is provided below along with accompanying figures that illustrate the principles of the invention. These details are provided for the purpose of example and the invention may be practiced according to the claims without some or all these specific details.

Other methods and data types rely heavily on theoretical or inaccurate data instead of the types of actual data provided by the present systems and methods. The present systems and methods use unmanned air vehicles (UAVs), including, but not limited to drones, in a geographic area to capture topographic data at one or more heights. In some embodiments, these UAVs may employ Lidar-based data collection techniques, components, or methods among others. The captured data includes actual data that can be analyzed to determine many wireless network characteristics, including locations, positions, signal inhibitor, predictions, or sight paths, among other things. Under the present systems and methods, one or more network designs or orientations can be used to design wireless mesh networks, among other things. In some embodiments, the UAVs may incorporate the use of one or more data recording devices that may record data in multiple directions or in various combinations (i.e., serially, parallel, simultaneously, etc.).

The following description provides examples and is not limiting of the scope, applicability, or examples set forth in the claims. Changes may be made in the function or arrangement of elements discussed without departing from the scope of the disclosure. Various examples may omit, substitute, or add various procedures or components as appropriate. For instance, the methods described may be performed in an order different from that described, or various steps may be added, omitted, or combined. Also, features described with respect to some examples may be combined in other examples.

Figure 1:
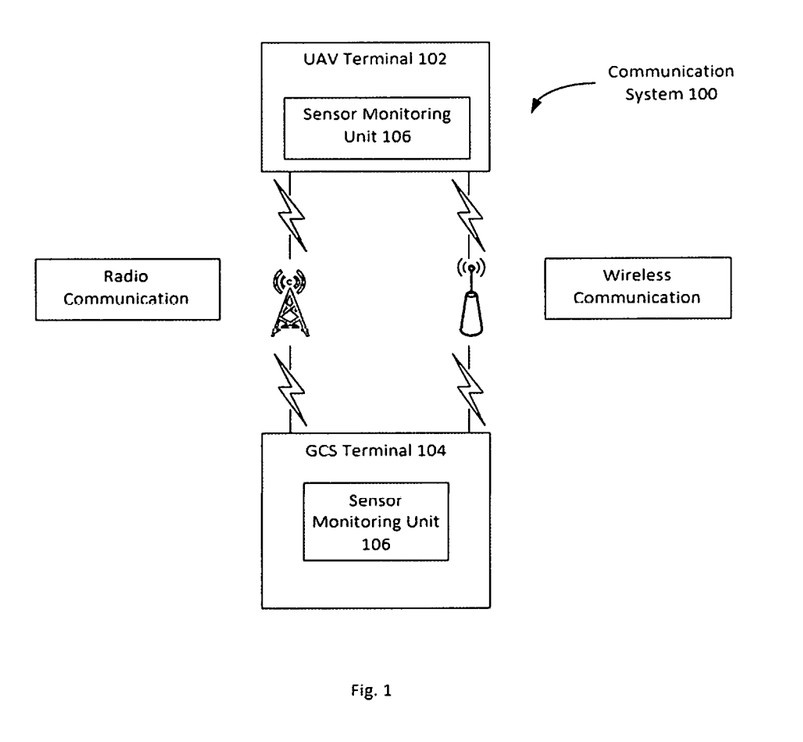
FIG. 1 depicts a communication network and main components of the network, according to some embodiments.

FIG. 1 illustrates an exemplary communication system 100, referred as to the system 100, for implementing the present disclosure, in accordance with an embodiment. The system 100 may include a UAV terminal 102, a GCS terminal 104, and a sensor monitoring terminal 106.

The UAV terminal 102 may be any module, component, or device capable of operating according to remotely transmitted control data as well as providing sensor data in feedback. For example, the UAV terminal 102 may include, or may be a part of, or otherwise associated with any movable autonomous or remotely controlled objects. Such objects may include, for example, manned or unmanned aerial vehicles (UAV) equipped with visual sensors or other types of sensors, robot, or other live or inanimate objects usable for performing surveillance and tracking, remote sensing, search and rescue, scientific research, and other functions.

The GCS terminal 104 may include, be a part of, or otherwise associated with any object or device capable of transmitting remote control instructions or control data to the UAV terminal 102. The control instructions, control data, or command signals may be generated by the GCS terminal 104 according to inputs provided by a user operating the GCS terminal 104 or a control system algorithm implemented to pilot UAVs. The GCS terminal 104 may include one or more computing devices in the base station. In some embodiments, the GCS terminal 104 may be a handheld or wearable device. For example, the GCS terminal 104 may include a server, desktop, smartphone, tablet, laptop, glasses, gloves, helmet, either alone or in combination. The GCS terminal 104 may include a user interface, such as a keyboard, mouse, joystick, touchscreen, or display for a user to interact with the GCS terminal 104, such as through manually entered commands, voice control, gesture control, position control (e.g., via a movement, location, or tilt of the GCS terminal 104), or the like.

The sensor monitoring terminal 106 may include, be a part of, attachable to, or otherwise associated with any object or device capable of capturing sensor data for the UVA or the GCS. The sensor monitoring terminal 106 may receive input data from one or more sensors built-in the UAV terminal 102 or one or more sensors implemented at the GCS to monitor one or more flight control related parameters, such as weather parameters, a status of UAV and such. In one implementation, the sensor monitoring terminal 106 may be implemented at each UAV terminal 102 or at GCS terminal 104 or both or as an individual component connected to the UAV and FCS terminals.

Furthermore, the sensor monitoring terminal 106 may be configured to display, store, transmit, or otherwise process the received sensor data. For example, the sensor monitoring terminal may include a processor for processing the received data, and a memory for storing the received data. In some embodiments, the sensor monitoring terminal 106 may be configured to transmit the received data, processed or unprocessed, to another device (such as a remote server associated with a remote or cloud storage or service).

The sensor monitoring terminal 106 may include a display unit for viewing information received from the UAV terminal 102. For example, the sensor monitoring terminal 106 can be configured to display state information of the UAV terminal 102 with respect to position, translational velocity, translational acceleration, orientation, angular velocity, angular acceleration, or any suitable combinations thereof. In some embodiments, the sensor monitoring terminal may be configured to display information acquired by the UAV terminal 102 or the payload carried by the UAV terminal 102. The payload carried by the UAV terminal 102 may include various sensors, such as global positioning system (GPS) sensors, motion sensors, inertial sensors, proximity sensors, image sensors, pressure sensors, thermo sensors, chemical sensors, and the like.

In various embodiments, the flight control data may include any information provided to the UAV terminal 102 by the GCS terminal 104. In some embodiments, such information may be usable for controlling an aspect of the UAV terminal 102, such as an operation of a component of the UAV terminal 102. The flight control data may be used, for example, to pilot the UAV terminal 102, a payload carried by the UAV terminal 102, or a component of the UAV terminal 102 along with respect to one, two or more of six degrees of freedom (e.g., three degrees of freedom in translation and three degrees of freedom in rotation). For instance, the control data may include information for adjusting the position, attitude, speed, or acceleration of the UAV terminal 102 or any component thereof, controlling a propulsion unit of the UAV terminal 102, causing physical transformation or restructuring of the UAV terminal 102, the payload carried by the UAV terminal 102 or a component of the UAV terminal 102. For instance, the flight control data may include instructions for turning on or off a sensor carried by the UAV terminal 102, starting or stopping a device (e.g., rotor) or process running on the UAV terminal 102, and the like. As another example, the flight control data may be used to control the operations of a payload (e.g., image capturing device) carried by the UAV terminal 102. Such operations may include, for example, taking still or moving pictures, zooming in or out, turning on or off, switching imaging modes, changing image resolution, changing focus, changing depth of field, changing exposure time, changing viewing angle or field of view, and the like.

In some instances, flight control data generated by the GCS terminal 104 may include instructions related to the spatial disposition, movements, actuations, or controls of the UVA. For example, the flight control data may result in a modification of the location or orientation of the UAV (e.g., via control of one or more propulsion mechanisms). In some instances, the UAV terminal 102 can include a propulsion system that includes one or more rotors configured to provide a lift or thrust for the UAV terminal 102. In such cases, the control data can be used to control the rotational speed or angle of the one or more rotors. The control data from the GCS terminal 104 may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In various embodiments, the sensor data can include any information captured and transmitted by the UAV terminal 102 as described earlier. In some instances, the sensor data can include information about a state of the UAV terminal 102 or a component thereof, data (e.g., sensor data) acquired by the UAV terminal 102, and the like. Such sensor data may be indicative of an operational state of the UAV terminal 102 or an environment surrounding the UAV terminal 102. Exemplary sensor data may include information about the speed, acceleration, position, altitude, or the like of the UAV terminal 102 at any given point in time or during a given period of time. The sensor data may also include information acquired or collected by sensors onboard the UAV terminal 102 such as visual or audio data, GPS information, proximity information, and the like. The sensor data provided by the UAV terminal 102 can be used to control the spatial disposition, velocity, or orientation of the UAV terminal 102. Alternatively, the sensor data can be used to provide data regarding the environment surrounding the movable object, such as weather conditions, proximity to potential obstacles, location of geographical features, location of manmade structures, and the like.

In various embodiments, the UAV terminal 102 and the GCS terminal 104 104 may be coupled to each other over one or more communication networks. For example, a radio module 212 may have been implemented to establish communication between the UAV terminal 102 and GCS 104 via radio frequency. A radio frequency may allow the GCS to broadcast a message. In some embodiments, the UAV terminal 102, the GCS terminal 104, and the sensor monitoring terminal 106 may have been coupled over wireless communication for signal data transmission over wireless data communication protocols. Communication modules are described in detail in reference to FIG. 2 in subsequent disclosure.

Figure 2:
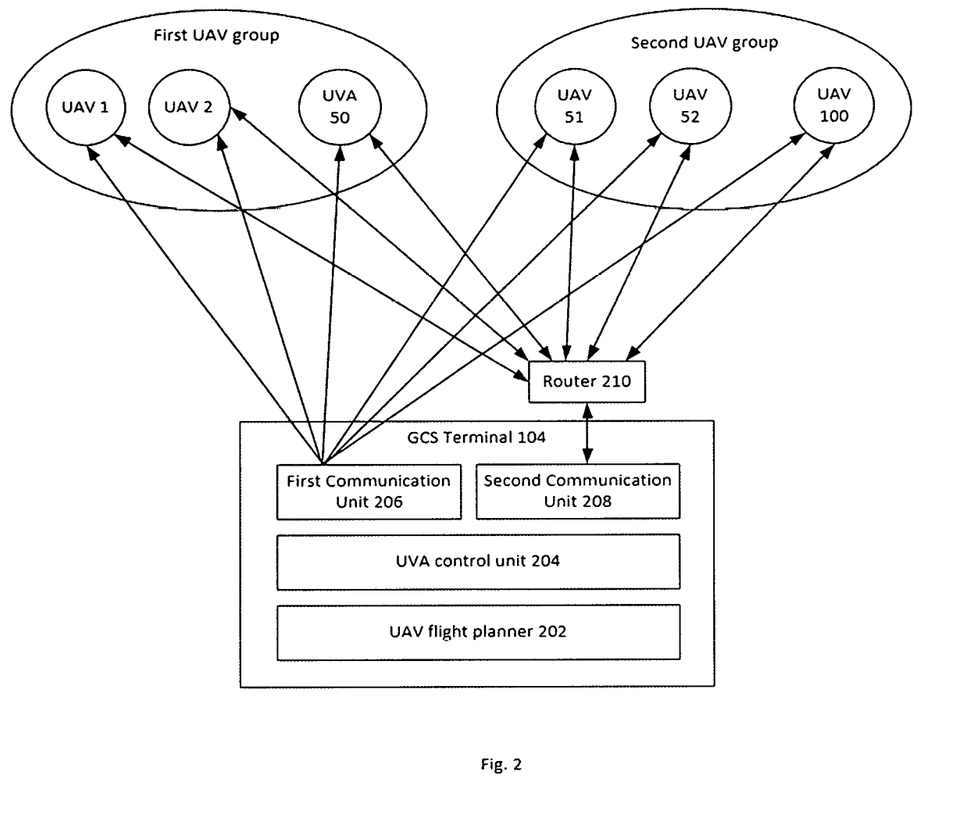
FIG. 2 depicts system components of a computing system implemented to establish communication between the GCS terminal and the UAV terminal, according to some embodiments.

As illustrated in FIG. 2, in accordance with an embodiment, the GCS terminal 104 and the UAV terminal 102 may be communicatively coupled to each other over wireless communication networks. It can be understood that for conciseness and facile description, any reference to UVA has been denoted as UAV terminal 102. However, the UAV terminal 102 is a collective term that defines one or more UAVs organized within the UAV flock. The UAV terminal 102 could be one UAV or multiple UAVs connected within the network. Referring to FIG. 2, the UAV flock may be divided into at least two groups at the GCS terminal 104. Two groups may be referred to as the first UAV group and second UAV group. Each UAV of the first and second UAV groups is coupled to the GCS unit. For example, in the first UAV group, 50 UVAs are aligned, numbered as 1, 2, 3, . . . 50. In the second UAV group, 50 UAVs are aligned, numbered as 51, 52, 53 . . . 100. Each UAV terminal 102 corresponding to at least one UAV from the first and second group may be communicatively coupled to the GCS terminal 104.

According to an embodiment, the GCS terminal 104 102 may include a UAV flight planner 202, a UAV control unit 204, a first communication module to facilitate radio communication, a second communication module to facilitate bidirectional communication between the GCS terminal 104 and the UAV terminal 102.

In some embodiments, the GCS terminal 104 may include an UAV flight planner 202. The UAV flight planner 202, in one example, may be a plugin that may be configured to plan an entire flight mission considering various flight parameters and the risk factors in advance. The UAV flight planner 202 may generate the flight mission that can be executed by UAVs. The UAV flight planner 202 may include, but may not be limited to, a trajectory control unit for planning trajectory for each UAV as such each UAV may have to travel shorted route possible, a trajectory optimization unit to optimize the trajectory planning further for shortest distance, minimum flying duration, and minimum consumption of resources, and a mission planning unit to plan entire flight mission based on optimized trajectory planning.

In some embodiments, the GSC terminal may include an UAV control unit 204. The UAV control unit 204 may be configured to enforce the flight mission plan received by the UAV flight planner 202. The UAV control unit 204 may execute the flight mission plan by generating one or more control signals, in one implementation. In another implementation, the UVA control unit may generate a flight mission plan file to be transmitted to UAV terminal 102, where the UAV terminal 102 may be configured to recode the control instructions wrapped into the flight mission plan file into an UAV controller 216 for execution. Thereby, by means of communicating the flight mission in form of control signals or control instructions, the UVA control unit may control UVA terminals. In one implementation, the communication means may be a first communication unit 206 and second communication unit 208 of the GCS terminal 104.

In some embodiments, the first communication unit 206 of the GCS terminal 104 may be implemented as a radio module 212 to broadcast a communication request to the UAV terminal 102. The first communication unit 206 may be wireless (e.g., radio), but using different frequency bands, with no overlap in the radio spectrum. For example, the radio module 212 may use one of the industrial, scientific, and medical (ISM) radio bands such as the 2.4 GHz band. In another implementation, radio module 212 may use a different band, such as a different ISM band, air band, marine band, amateur radio band, citizen's band, personal radio service band, or other licensed or unlicensed band.

In various embodiments, apart from above radio frequency techniques, any suitable analog or digital modulation schemes may be used for the data transmission between the GCS and the UAV terminal 102. The examples include but may not be limited to pulse-width modulation (PWM), pulse-position modulation (PPM), pulse-amplitude modulation (PAM), phase-shift keying (PSK), frequency-shift keying (FSK), amplitude-shift keying (ASK), quadrature amplitude modulation (QAM), spread-spectrum modulation schemes such as frequency-hopping spread spectrum (FHSS), and the like.

According to some embodiments, the second communication unit 208 of the GCS terminal 104 may be a wireless communication unit 214 configured to establish wireless communication between the GCS and UAV terminal 102. Typically, the communication is unilateral, allowing only control data to be transmitted from the GCS terminal 104 to the UAV terminal 102. In such cases, the first communication module of the GCS terminal 104 may be configured to function only as a transmitter while the first communication module 108 of the UAV terminal 102 may be configured to function only as a receiver. In a preferable embodiment, the communication may be bi-directional, allowing data to flow in both directions between the UAV terminal 102 and the GCS terminal 104. In such cases, the first communication module of the GCS terminal 104 and the first communication module 108 of the UAV terminal 102 may each be capable of transmitting and receiving data.

A wireless network such as wireless network may further include a system of terminals, gateways, router 210, or the like coupled by wireless radio links, or the like, which can move freely, randomly, or organize themselves arbitrarily, such that network topology may change, at times even rapidly. A wireless network can further employ a plurality of network access technologies including Long Term Evolution (LTE), WLAN, Wireless Router 210 (WR) mesh, or wide area network (WAN), virtual private network (VPN), wireless network (using 802.11, for example), 345 MHz, Z-WAVE®, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB).

In some embodiments, the data to be transmitted may be packed in a Signal-packet which is communicated via a network, such as a network of participating digital communication networks that can be compatible with or compliant with one or more protocols. The signal data packet may include an identifying mask so that the UAV can recognize the sender.

In some embodiments, the GCS terminal 104 may include a UAV flock flight planner, referred to as a flight planner. The flight planner may be implemented to receive the flight planning related parameters and plan the mission flight. In one implementation, the UAV flock flight planner may be communicatively coupled to the sensor monitoring terminal 106 that may be attached to the GCS terminal 104. In another implementation, the UAV flock flight planner may be configured to receive data transmission from the sensor monitoring terminal 106 that may be implemented at the UAV terminal 102. The sensor monitoring terminal 106, in one embodiment, may gather data relating to one or more parameters that may directly or indirectly affect the flight mission. The gathered data may be processed by the sensor monitoring terminal 106 before sending it to the UAV flock flight planner. The UAV flock flight planner may apply one or more dynamic rules that may correspond to the flight parameters and associated characteristics (i.e., speed, altitude acceleration), and collision prevention rules that may correspond to the collision parameters and associated characteristics (i.e., weather parameters, trajectory for other UAVs in close proximity, minimum distance from juxtaposed UAVs, etc.). Thus, the UAV flock flight planner, taking all affecting parameters into consideration may determine a flight plan for a UVA flock from the flight mission point of view. In one implementation, the UAV flock flight planner may determine the flight plan for each UAV. Each UAV, thus, may receive a flight plan, over a wireless communication link. Few aspects of the flight plan may be a trajectory route, time of take-off and landing, duration and location for hovering, and the like. The flight plan, in accordance with one embodiment, may be transferred as a bin file to the GCS terminal 104.

Figure 3:
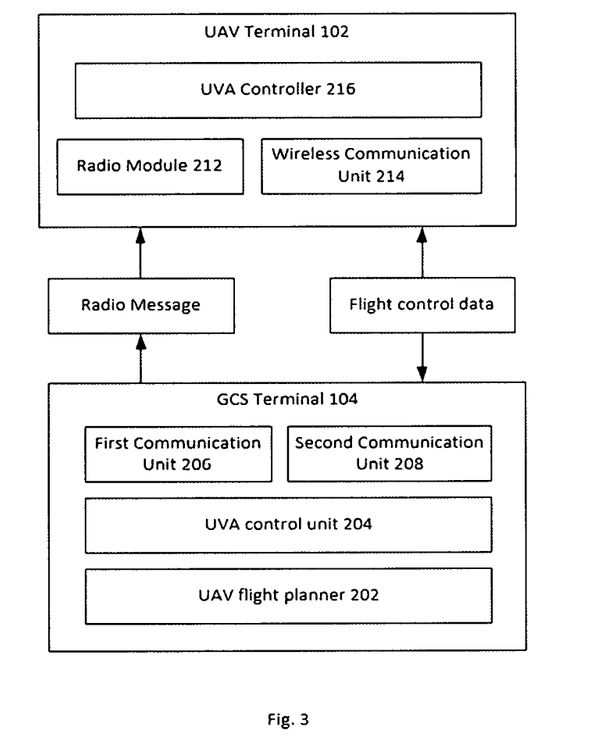
FIG. 3 depicts block diagram of system components configured for data transmission over wireless communication network, according to some embodiments.

FIG. 3 illustrates, in accordance with some embodiments, bidirectional communication established between the GCS terminal 104 and the UAV terminal 102. As described in conjunction with FIG. 2, the GCS terminal 104 may include the flight planner, the control unit, the first communication unit 206, and the second communication unit 208. Similarly, the UAV terminal 102 may include UAV controller, UAV first communication unit 206, and UAV second communication unit 208, according to the embodiment.

In some embodiments, the UAV first communication module may be a radio module 212, and UAV second module may be a wireless communication module. The radio module 212 may include a radio transceiver to receive a message broadcasted by the GCS terminal 104. The UAV second communication module may include a wireless receiver and transmitter to receive the data transmitted by the GCS terminal 104 and to transmit the data to the GCS terminal 104.

In some embodiments, the first communication unit 206 of the UAV terminal 102 may be implemented as a radio module 212 to receive broadcast communication requests from the GCS terminal 104 over Radio channel. The first communication unit 206 may be wireless (e.g., radio), but using different frequency bands, with no overlap in the radio spectrum. For example, the radio module 212 may use one of the industrial, scientific, and medical (ISM) radio bands such as the 2.4 GHz band. In another implementation, radio module 212 may use a different band, such as a different ISM band, air band, marine band, amateur radio band, citizen's band, personal radio service band, or other licensed or unlicensed band.

In various embodiments, apart from above radio frequency techniques, any suitable analog or digital modulation schemes may be used for the data transmission between the GCS and the UAV terminal 102. The examples include but may not be limited to pulse-width modulation (PWM), pulse-position modulation (PPM), pulse-amplitude modulation (PAM), phase-shift keying (PSK), frequency-shift keying (FSK), amplitude-shift keying (ASK), quadrature amplitude modulation (QAM), spread-spectrum modulation schemes such as frequency-hopping spread spectrum (FHSS), and the like.

According to some embodiments, the second communication unit 208 of the UAV terminal 102 may be a wireless communication unit 214 configured to establish wireless communication between the GCS and UAV terminal 102. Typically, the communication is unilateral, allowing only control data to be transmitted from the UAV terminal 102 to the GCS terminal 104. In such cases, the first communication module of the UAV terminal 102 may be configured to function only as a receiver while the first communication module of the GCS terminal 104 may be configured to function only as a transmitter. In a preferable embodiment, the communication may be bi-directional, allowing data to flow in both directions between the UAV terminal 102 and the GCS terminal 104. In such cases, the first communication module of the GCS terminal 104 and the first communication module 108 of the UAV terminal 102 may each be capable of transmitting and receiving data.

A wireless network, such as wireless network may further include a system of terminals, gateways, router, or the like coupled by wireless radio links, or the like, which can move freely, randomly, or organize themselves arbitrarily, such that network topology may change, at times even rapidly. A wireless network can further employ a plurality of network access technologies including Long Term Evolution (LTE), WLAN, Wireless Router 210 (WR) mesh, or wide area network (WAN), virtual private network (VPN), wireless network (using 802.11, for example), 345 MHz, Z-WAVE®, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB).

As described earlier, the first communication unit 206 may receive radio message broadcast, and the second communication unit 208 may receive flight control data. Referring to FIG. 3, according to an embodiment, the first communication unit 206 and the second communication unit 208 may be communicatively coupled to the UAV controller. The UAV controller 216 may be configured to process data received by the first communication unit 206 and the second communication unit 208, and to control UAV operations based on the flight control data received by the second communication unit 208.

In one embodiment, the UAV controller 216 may include (not shown in the Figure) a processing unit and a control module coupled to the processing unit. The processing unit can have one or more processors, such as a programmable processor (e.g., a central processing unit (CPU)). The processing unit can be operatively coupled to a memory. The memory can include transitory or non-transitory storage media configured to store data, or logic, code, or program instructions executable by the processing unit for performing one or more routines or functions. The memory can include one or more memory units (e.g., removable media or external storage such as an SD card, random access memory (RAM), read-only memory (ROM), and the like). The processing unit is coupled to the control module to control flight operations.

The control module can be configured to control the propulsion mechanisms of the controlled terminal to adjust the spatial disposition, velocity, or acceleration of the controlled terminal with respect to six degrees of freedom. The control module can control the state of one or more components of the UAV terminal 102 or objects carried by the UAV terminal 102, such as a camera. Thus, the UAV controller 216 can control UAV operations based upon data communication established between the communication modules of the UAV terminal 102 and the GCS terminals 104.

One exemplary illustration has been described herein. The UAV terminal 102 may download flight mission control data in the form of flight mission bin files over wireless communication, such as Wi-Fi. In the first iteration of the UAV control operation, the first communication unit 206 of the GCS terminal 104 may send a radio command over ISM 2.4 Hz. In an example, the GCS can be a personal computer or laptop with network connectivity to Wi-Fi hotspot (i.e., ethernet connection). To facilitate data communication via Ethernet and Wi-Fi connectivity, an embedded IoT gateway may be implemented, for example, xPico240. Communication can be established between the UAV terminal 102 and GCS terminal 104 via xPico240 which can also be a second communication unit 208 of the GCS terminal 104. First, the GCS terminal 104 broadcasts the radio message requesting communication activation between the UAV and GCS terminal 104 by a first communication unit 206 of the GCS. In response to the radio message, the UAVs turn on the second communication unit 208, i.e., xPico240 of the UAV terminal 102, establishing contact with xPico240 of the GCS terminal 104. is to turn on xPico on the copters one by one (group by group) by sending a special command. Switching on xPico on the UAV terminal 102 is controlled using the RESET xPico pin.

Figure 4:
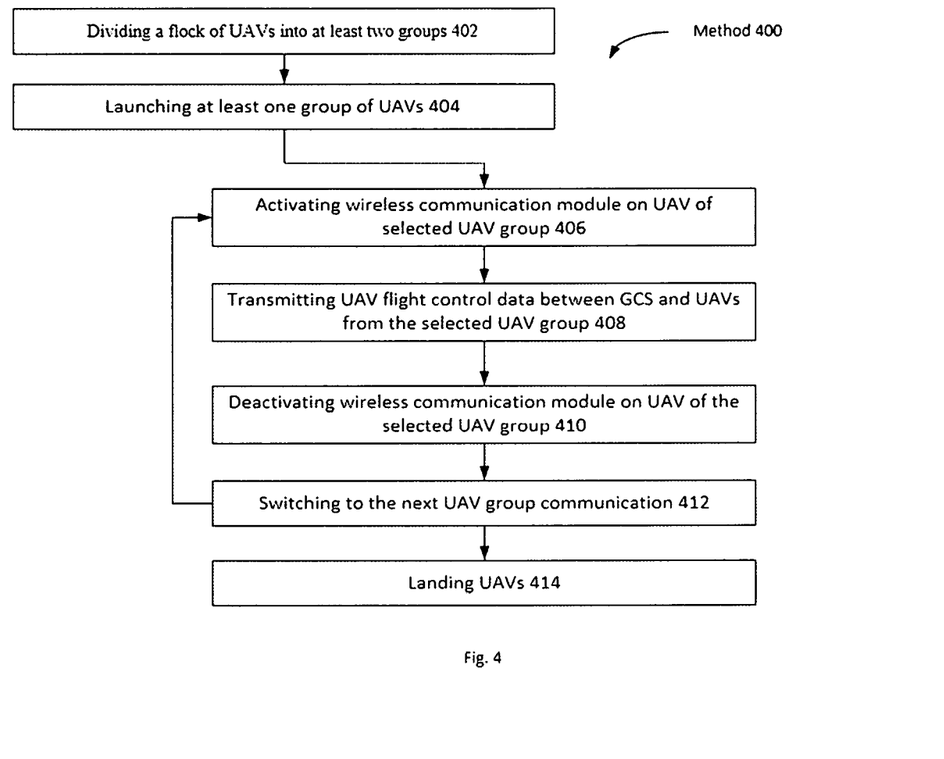
FIG. 4 illustrates method steps involved in performing data transmission between the GSC terminal and the UAV terminal, according to some embodiments.

FIG. 4 depicts a flowchart of method steps for establishing bidirectional communication between the UAV terminal 102 and the GCS terminal 104 for collecting telemetry and uploading flight control data, in accordance with one embodiment.

At step 402, a UAV flock is divided into at least two groups by the GCS terminal 104. The UAV flock may have 50, 100, or 2000 UAVs. All UAVs are divided to form at least two groups.

At step 404, both UAV groups are launched by the GCS terminal 104.

AT step 406, wireless communication module is activated on UAV of selected UAV group.

At step 408, UAV flight control data between the GCS terminal 104 and the UAV terminal 102 from the selected UAV group is transmitted.

At step 410, upon receiving a deactivation request made by the GCS terminal 104, the UAV terminal 102 may deactivate the wireless communication module on UAV of the selected UAV group.

At step 412, the next UAV group is switched for communication. For this group, the method steps 406-410 are repeated.

At step 414, UAVs are landed.

Figure 5:
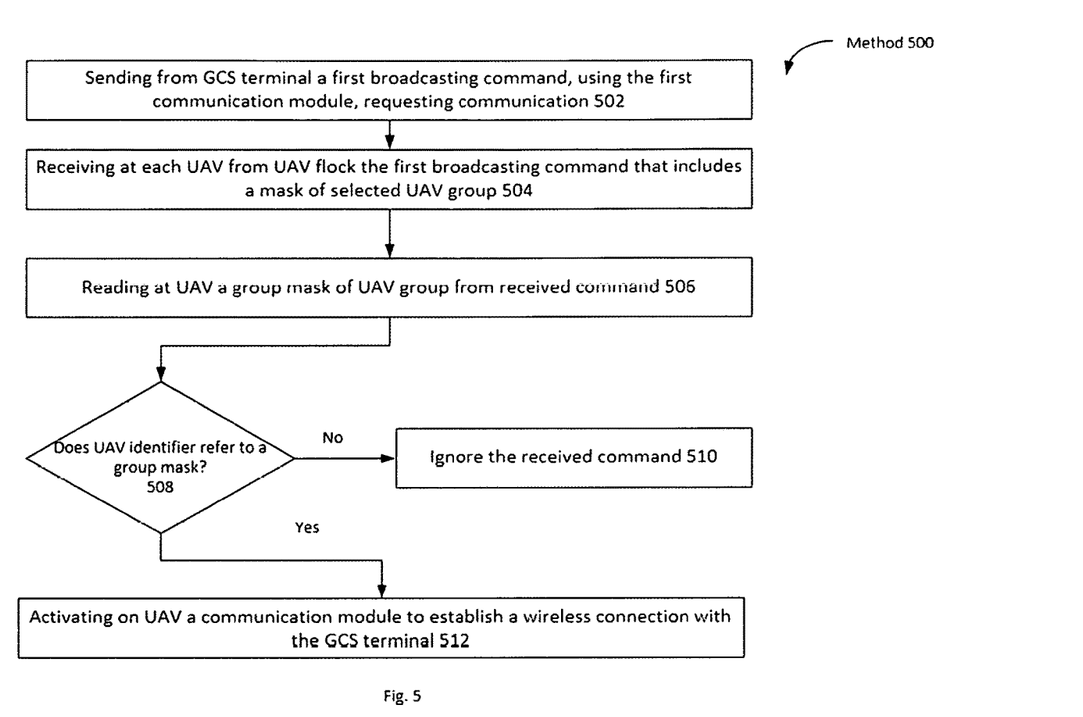
FIG. 5 illustrates method steps involved in activating a communication module, according to some embodiments.

FIG. 5 depicts a flow diagram for activating a wireless communication module, according to some embodiments.

At step 502, a first broadcasting message is sent by the GCS terminal 104 using a first communication module of GCS terminal 104. The first broadcasting message may be a request to respective UAV terminal 102 from a selected UAV group for initiating a wireless communication unit 214.

At step 504, the first broadcasting message is received at each UAV from the UAV flock. The first broadcasting message may include an identity mask of selected UAV groups.

At step 506, the group mask is read by the UAV group to determine if the broadcast message is intended for the UAV group.

At step 508, it is determined that if the identified mask refers to the group mask.

If no, at step 510, the received broadcasted message is ignored. If yes, as requested within the broadcasted message, the wireless communication unit 214 is activated by the UAV terminal 102 to establish wireless communication between the GCS terminal 104 and the UAV terminal 102.

Figure 6:
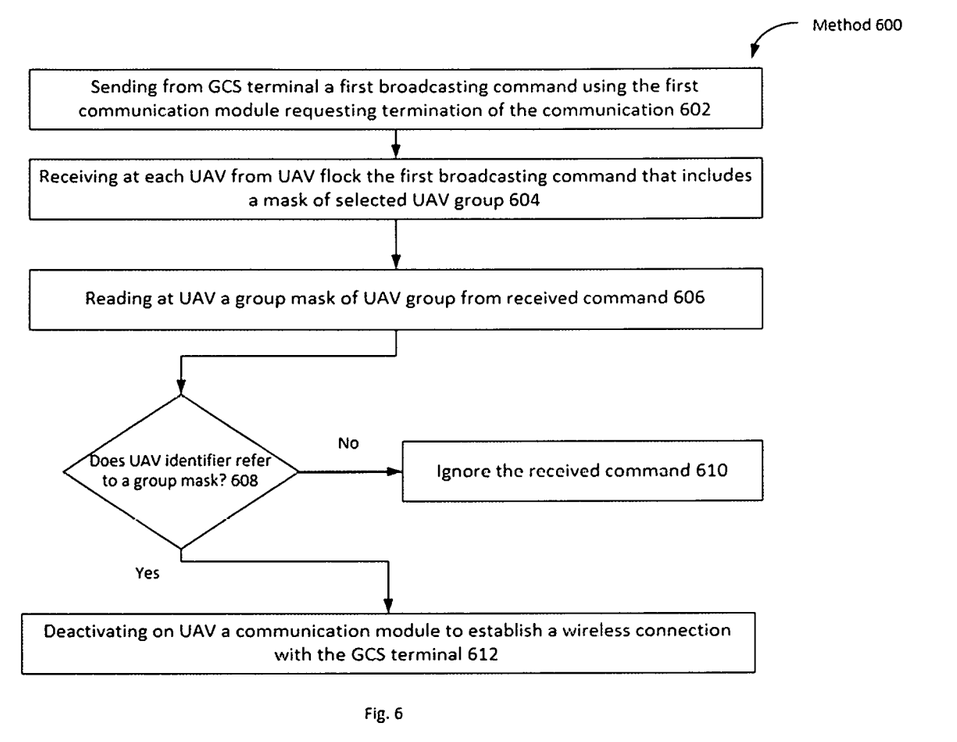
FIG. 6 illustrates method steps involved in deactivating a communication module, according to some embodiments.

FIG. 6 depicts flow diagram for deactivating a wireless communication module, according to some embodiments.

At step 602, a second broadcasting message is sent by the GCS terminal 104 using a first communication module of the GCS terminal 104. The second broadcasting message may be a request to respective UAV terminal 102 from the selected UAV group for initiating a wireless communication unit 214.

At step 604, the second broadcasting message is received at each UAV from the UAV flock. The second broadcasting message may include an identity mask of selected UAV groups.

At step 606, the group mask is read by the UAV group to determine if the broadcast message is intended for the UAV group.

At step 608, it is determined that if the identified mask refers to the group mask.

If no, at step 610, the received broadcasted message is ignored. If yes, as requested within the broadcasted message, the wireless communication unit 214 is deactivated by the UAV terminal 102 to establish wireless communication between the GCS terminal 104 and the UAV terminal 102.

Figure 7:
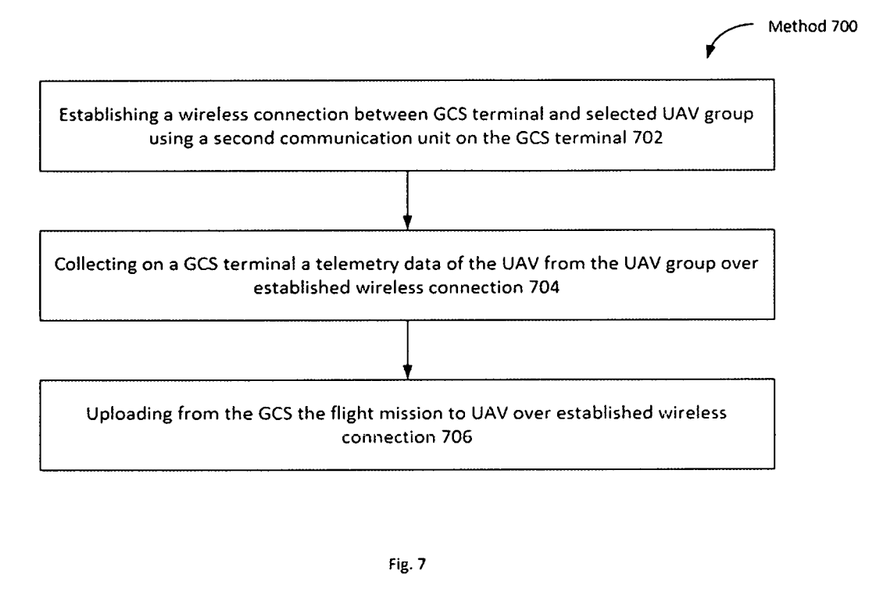
FIG. 7 illustrates method steps for collecting telemetry, according to some embodiments.

FIG. 7 depicts a method of collecting telemetry and uploading the flight control parameters to the UAV terminal 102. At step 702, a wireless connection of the GCS and selected UAV group using a second communication unit 208 on the GCS. At step 704, telemetry data of the UAV from the UAV group is collected by the GCS terminal 104 over established wireless connection. At step 706, the flight control data is uploaded by the GCS terminal 104 over an established wireless connection.

The invention claimed is:

1. A bi-directional communication system for controlling Unmanned Aerial Vehicles (UAVs), the bi-directional communication system comprising:
   a GCS terminal, configured to divide UAVs into at least two groups of UAVs characterized by two different identity masks, sequentially establish connection with each group of UAVs, and exchange flight control data with UAVs, the GCS terminal comprising:
   a first communication unit of the GCS configured to:
      select a first group of UAVs,
      broadcast a first message with a radio module to all UAVs, wherein the first broadcasting message comprises an identity mask of the first group of UAVs and a command to activate a wireless communication module on each UAV from the first group of UAVs, and
      broadcast a second message with a radio module to all UAVs, wherein the second broadcasting message comprises an identity mask of a second group of UAVs and a command to deactivate a wireless communication module on each UAV from the second group of UAVs; and a second communication unit of the GCS configured to:
establish a wireless exchange link with the activated wireless communication module of each UAV in the first group of UAVs, and
exchange flight control data with each UAV in the first group of UAVs over the wireless exchange link.

2. The system of claim 1, wherein the exchange of flight control data corresponds to at least one of:
receipt of telemetry data from each UAV in the first group of UAVs; and
upload of details associated with tasks to be performed by the first group of UAVs.

3. The system of claim 1, further comprising a UAV swarm flight planner configured to:
receive one or more inputs from a user regarding flight data; and
convert the received inputs to a predefined format for exchange by the second communication unit.

4. The system of claim 1, further comprising a UAV swarm control unit to:
generate the one or more radio message and one or more commands; and
enable switching of bi-directional communication of the GCS from the first group of UAVs to the second group of UAVs from the at least two groups of UAVs.

5. The system of claim 4, wherein for the switching of bi-directional communication of the GCS from the first group of UAVs to the second group of UAVs:
the UAV swarm control unit generates a deactivation command for wireless communication module of each UAV from the first group of UAVs;
the first communication unit transmits the generated deactivation command to the remote module of each UAV from the first group of UAVs;
the UAV swarm control unit generates an activation command for wireless communication module of each UAV from the second group of UAVs;
the first communication unit transmits the generated activation command to the remote module of each UAV from the second group of UAVs;
the second communication unit to:
establish a wireless exchange link with a wireless communication module of each UAV in the second group of UAVs; and
exchange flight control data with each UAV in the second group of UAVs over the wireless exchange link.

6. A method for bi-directional communication for controlling Unmanned Aerial Vehicles (UAVs), the method comprising:
dividing UAVs into at least two groups of UAVs characterized by two different identity masks;
selecting a first group of UAVs;
broadcasting a first message with a radio module to all UAVs, wherein the first broadcasting message comprises an identity mask of the first group of UAVs and a command to activate a wireless communication module on each UAV from the first group of UAVs;
broadcasting a second message with a radio module to all UAVs, wherein the second broadcasting message comprises an identity mask of a second group of UAVs and a command to deactivate a wireless communication module on each UAV from the second group of UAVs;

establishing, by a second communication unit, a wireless exchange link with the activated wireless communication module of each UAV in the first group of UAVs; and
exchanging, by the second communication unit, flight control data with each UAV in the first group of UAVs over the wireless exchange link.

7. The method of claim 6, wherein the exchanging of flight control data corresponds to at least one of:
receiving of telemetry data from each UAV in the first group of UAVs; and
uploading of details associated with tasks to be performed by the first group of UAVs.

8. The method of claim 6, further comprising:
receiving, by a UAV swarm flight planner, one or more inputs from a user regarding flight data; and
converting, by the UAV swarm flight planner the received inputs to a predefined format for exchange by the second communication unit.

9. The method of claim 6, further comprising:
generating, by a UAV swarm control unit, the one or more radio message and one or more commands; and
enabling, by the UAV swarm control unit, switching of bi-directional communication of the GCS from the first group of UAVs to the second group of UAVs from the at least two groups of UAVs.

10. The system of claim 1, wherein the exchange of flight control data with each UAV is unilateral such that the first communication unit functions only as a transmitter.

11. The system of claim 1, wherein the second communication unit of the GCS establishes a wireless exchange link with respective wireless communication modules of only a subset of the UAVs in the first group of UAVs based on the identity mask of the first group of UAVs.

12. The system of claim 1, wherein each UAV in the first group of UAVs is assigned a different task as that of the other UAVs in the first group of UAVs according to the flight control data.

13. The system of claim 1, further comprising:
a sensor monitoring unit configured to gather data relating to one or more parameters associated with the flight mission,
wherein the flight control data is based on the one or more parameters.

14. The method of claim 6, wherein the exchange of flight control data with each UAV is unilateral such that the first communication unit functions only as a transmitter.

15. The method of claim 6, wherein the second communication unit of the GCS establishes a wireless exchange link with respective wireless communication modules of only a subset of the UAVs in the first group of UAVs based on the identity mask of the first group of UAVs.

16. The method of claim 6, wherein each UAV in the first group of UAVs is assigned a different task as that of the other UAVs in the first group of UAVs according to the flight control data.

17. The method of claim 6, further comprising:
gathering data relating to one or more parameters associated with the flight mission, wherein the flight control data is based on the one or more parameters.

18. The system of claim 1, further comprising a UAV controller configured to
activate the wireless communication module on the UAV upon receipt of the first broadcasting message when the identity mask of the first group of UAVs in the received first broadcasting message corresponds to a group mask corresponding to a group of UAVs to which the UAV belongs; and deactivate the wireless communication module on the UAV upon receipt of the second broadcasting message when the identity mask of the second group of UAVs in the received second broadcasting message corresponds to a group mask corresponding to a group of UAVs to which the UAV belongs.

19. The system of claim 1, wherein the first communication unit of the GCS terminal is further configured to select the second group of UAVs and broadcast first and second messages comprising an identity mask of the second group of UAVs.

20. The method of claim 6, further comprising:

activating the wireless communication module on the UAV upon receipt of the first broadcasting message when the identity mask of the first group of UA Vs in the received first broadcasting message corresponds to a group mask corresponding to a group of UAVs to which the UAV belongs; and deactivating the wireless communication module on the UAV upon receipt of the second broadcasting message when the identity mask of the second group of UAVs in the received second broadcasting message corresponds to a group mask corresponding to a group of UAVs to which the UAV belongs.

\* \* \* \* \*